United States Patent [19]

Masaki

[11] Patent Number: 4,988,923
[45] Date of Patent: Jan. 29, 1991

[54] LIGHTING EQUIPMENT FOR PROVIDING BRIGHT ILLUMINATION WITH LIMITED SURGE

[75] Inventor: Kazumi Masaki, Osaka, Japan
[73] Assignee: Ken Hayashibara, Okayama, Japan
[21] Appl. No.: 323,220
[22] Filed: Mar. 15, 1989

Related U.S. Application Data

[63] Continuation of Ser. No. 99,528, Sep. 22, 1987.

[30] Foreign Application Priority Data

Sep. 30, 1986 [JP] Japan ................. 61-149814

[51] Int. Cl.⁵ ............................... H05B 39/04
[52] U.S. Cl. ................. 315/227 R; 315/244; 315/245; 315/224
[58] Field of Search .................. 315/284; 361/118

[56] References Cited

U.S. PATENT DOCUMENTS 3,293,537 12/1966 Sola ........................ 315/244
4,155,032 5/1979 Schlick et al. ............ 315/244
4,644,229 2/1987 Masaki .

FOREIGN PATENT DOCUMENTS 1563143 3/1970 Fed. Rep. of Germany .
3405516 8/1985 Fed. Rep. of Germany .
139584 8/1984 Japan .
2172452 9/1986 United Kingdom .

Primary Examiner—Eugene R. LaRoche
Assistant Examiner—Ali Neyzari
Attorney, Agent, or Firm—Browdy and Neimark

[57] ABSTRACT

A novel lighting equipment for providing bright illumination with limited surge, including a capacitor connected in parallel with an incandescent lamp, the capacitor having a capacitive reactance lower than the resistance of the filament at ambient temperature; an impedance having a time constant connected between the capacitor and an ac source; and means for rectifying the current from the ac source.

13 Claims, 6 Drawing Sheets

LIGHTING EQUIPMENT FOR PROVIDING BRIGHT ILLUMINATION WITH LIMITED SURGE

This application is a continuation of application Ser. No. 099,528, filed Sept. 22, 1987.

BACKGROUND OF THE INVENTION

1. Field of the invention

The present invention relates to a lighting equipment for providing bright illumination with limited surge.

2. Description of the prior art

Recently, many school children are suffering from myopia spuria. One of the major causes is the fatigue of the optic nerve that occurs due to the use of lighting equipments such as fluorescent lighting whose brightness varies time to time with the frequency of the ac source used. Another cause is that school children tend to stay in fluorescent illumination for hours. Fluorescent lamps display a monochromatic spectrum, and is entirely different from sunlight that bears all the spectrum components ranging from the far-red to the ultraviolet region.

SUMMARY OF THE INVENTION

In view of the foregoing, one object of the present invention is to provide a lighting equipment wherein an ac current is supplied after rectification to incandescent lamp to heat the filament to a temperature over its rating in order to provide an illumination that is similar to sunlight, free of time-dependent variations such as flicker, but includes all the spectrum components ranging from the far-red to the ultraviolet region.

Another object of the present invention is to provide a lighting equipment wherein switch-on surges are limited so that a bright illumination is attained without shortening the life of an incandescent lamp.

This and other objects as may become apparent hereinafter have been attained by the lighting equipment for providing bright illumination with limited surge, comprising a capacitor connected in parallel with an incandescent lamp, said capacitor having a capacitive reactance lower than the resistance of the filament at ambient temperature, an impedance having a time constant connected between said capacitor and an ac source, and means for rectifying the current from said ac source.

DESCRIPTION OF THE PREFERRED EMBODIMENTS

The present invention will hereinafter be explained with reference to the accompanying drawings, in which.

Throughout the accompanying drawings: symbol AC designates an ac source; C, a capacitor; L, an inductor; R, a resistor; F, an incandescent lamp; D, a diode bridge; and S, a switch.

Figure 1:
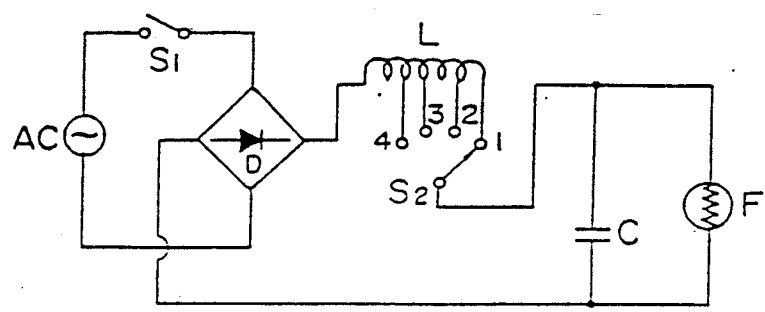
FIG. 1 illustrates a basic circuit according to the invention wherein a variable inductor is used.

FIG. 1 is illustrative of the basic circuit according to the invention, wherein a current supplied from ac source AC through power switch $S_1$ is subjected to full-wave rectification using diode bridge D and the output charges capacitor C through selection switch $S_2$ including inductance L. Incandescent lamp F is illuminated by the charge stored in capacitor C.

Figure 2:
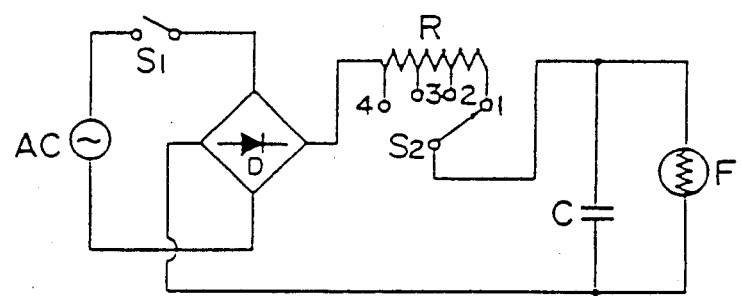
FIG. 2 illustrates another basic circuit according to the invention wherein a variable resistor is used.

FIG. 2 is illustrative of an embodiment wherein inductor L as used in FIG. 1 is replaced with resistor R.

Figure 3:
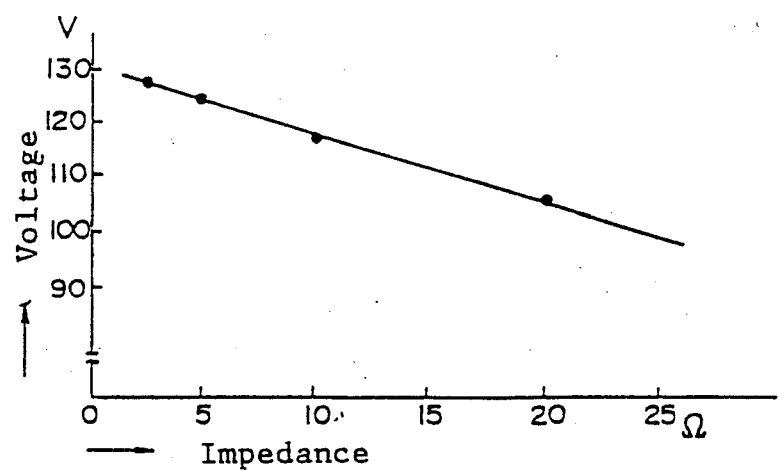
FIG. 3 is the graph showing the relationship between impedance and voltage.

The impedance of inductor L is determined by the synthetic value of the impedance and dc resistance of the coil member used. When the impedance is equalized to resistor R in FIG. 2, the voltage across incandescent lamp F varies as shown in FIG. 3 with the selection positions of switch $S_2$: In case the voltage of ac source AC is 100 volts, the peak voltage across capacitor C reaches 140 volts ($=\sqrt{2}\times 100$ volts) if the load is disconnected, while the peak voltage lowers down to 124 volts, when a 40 watt incandescent lamp F is used and either inductor L or resistor R with an impedance of 5 ohms is in connection. When the impedance increases to 10 ohms, the voltage further lowers to 116 volts.

Incandescent lamp F provides a brighter illumination when energized with such voltage. The illumination attained with a dc voltage of 124 volts is about two-fold brighter than that attained with an ac voltage of 100 volts, and the spectrum resembles that of morning sun.

In case such a high brightness is not required, the voltage can be lowered to 100 volts by turning selection switch $S_2$. In this case, incandescent lamp F provides a flickerless light as found in the shade.

Inductor L or resistor R inserted in the input circuit of capacitor C is to control the output voltage, as well as to limit switch-on surges. The insertion prolongs the life of switch contacts and prevents the outage of incandescent lamp F.

Figure 4:
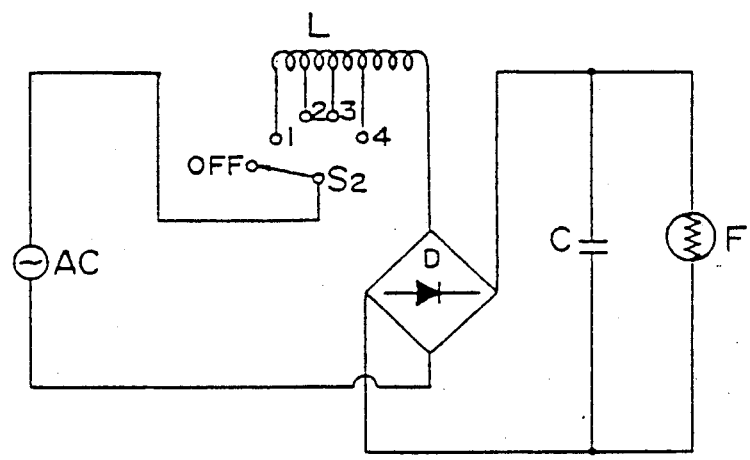
FIG. 4 is the circuit wherein an inductor is inserted in the input circuit of rectifier.
Figure 5:
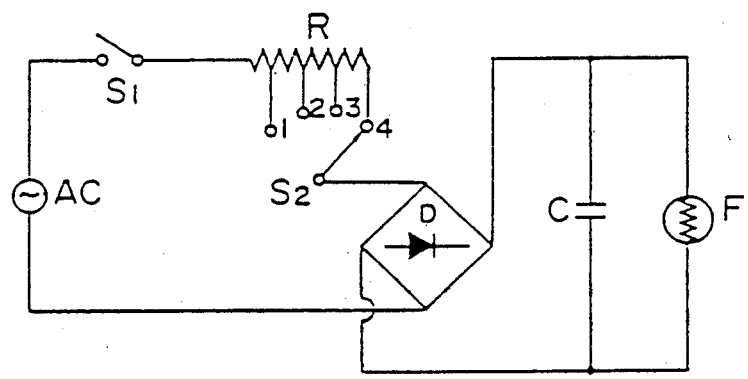
FIG. 5 is the circuit wherein a resistor is inserted in the input circuit of rectifier.

FIGS. 4 and 5 are illustrative of embodiments wherein inductor L or resistor R is provided in the input circuit of diode bridge D. These embodiments are as effective those as shown in FIGS. 1 and 2.

By providing an "off" position in selection switch $S_2$ as shown in FIG. 4, on/off switch $S_1$ can be omitted.

Inductor L may be a coreless inductor or an iron-core inductor of a wound- or laminated-iron-core that can limit surges into incandescent lamp when in connection with the input terminal of a rectifier circuit including smoothing capacitor C. The inductance is usually set to a level that limits surges but does not unnecessarily lower the voltage across incandescent lamp F. Preferably, inductor L and smoothing capacitor C are selected in such manner that the resonant circuit thereof develops the phase difference between the voltage and current components in surges, in other words, decreases the effective power of the surges. Inductor L with the lowest possible dc resistance is effective in limiting surges with a minimum heat generation by inductor L itself.

Figure 6:
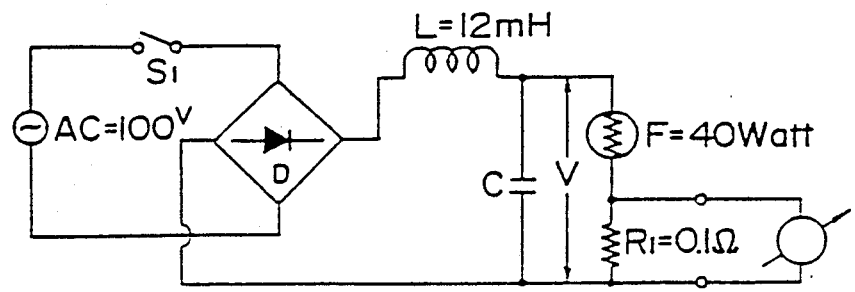
FIG. 6 is the circuit used to determine the magnitude of surges.
Figure 7:
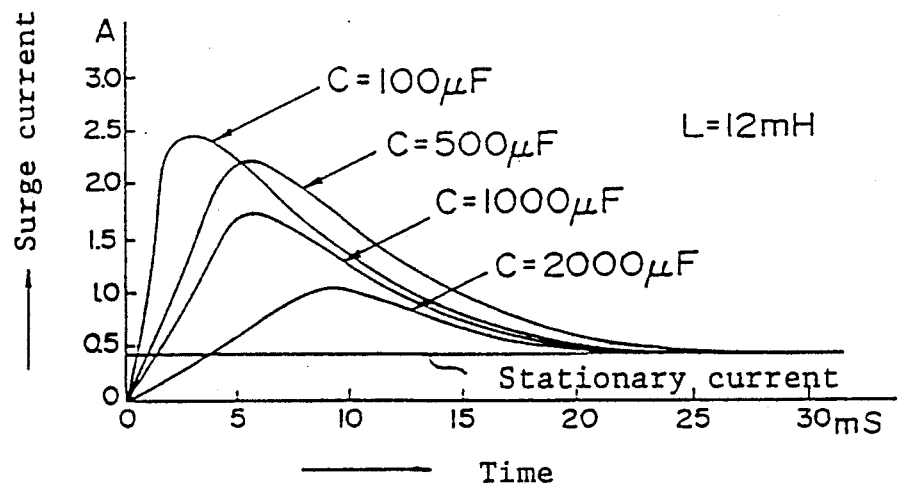
FIG. 7 is the graph showing the relationship between the capacitance of capacitor and the magnitude of surges.

FIG. 7 graphically shows the change of switch-on surges through incandescent lamp F when in the circuit as shown in FIG. 6 inductor L is fixed to 12 millihenries and capacitor C is varied from 100 to 2,000 microfarads. The magnitude of surges is determined by use of an oscilloscope to measure the voltage across resistor $R_1$ (0.1 ohm) connected in series with incandescent lamp F (as indicated in FIG. 6)

As is obvious from FIG. 7, a surge with a magnitude of about 2.5 amperes is observed when capacitor C is 100 microfarads, while the surge decreases to one ampere when capacitor C increases to 2,000 microfarads. These surges are extremely smaller than that (about 7 amperes) arising when the peak voltage (140 volts) of ac 100 volts is energized directly at ambient temperature to the filament of 40 watt incandescent lamp (about 20 ohms). This prolongs the life of incandescent lamps.

Figure 8:
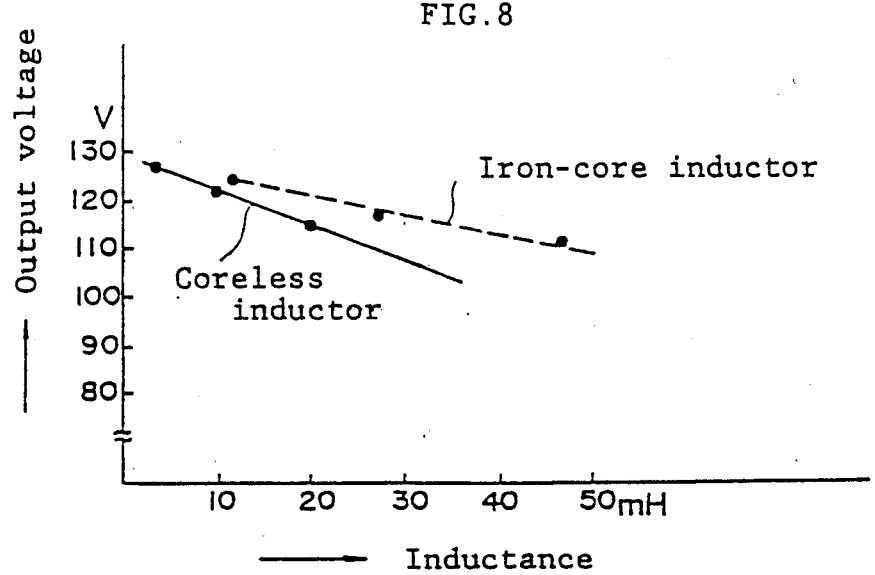
FIG. 8 is the graph comparing coreless and iron-core inductors for their output voltage.

FIG. 8 graphically shows the relationship between the inductance of inductor L and the output dc voltage in the circuit as shown in FIG. 6. FIG. 8 indicates that the output voltage attained with an iron-core inductor is higher than that attained with a coreless inductor. This may be explained by the fact that the internal resistance of iron-core inductors is lower because their winding is less. Since saturation of iron-core inductors may cause a high surge current, the use of a coreless inductor is desirable.

Figure 9:
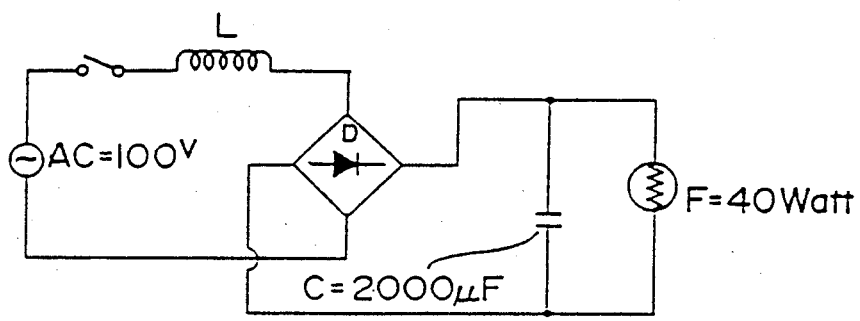
FIG. 9 is the circuit used to determine the relationship between the inductance of inductor and the magnitude of surges when the capacitance of the capacitor is held constant and the inductance of inductor is varied.
Figure 10:
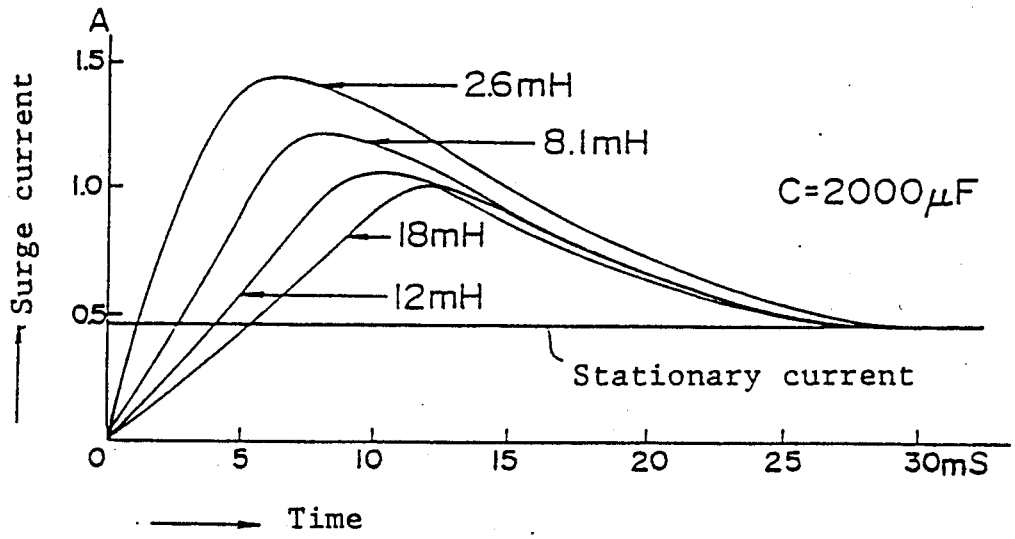
FIG. 10 is the time course of surges as determined with the circuit as shown in FIG. 9.

FIG. 9 is a circuit wherein inductor L is provided in the input circuit of diode bridge D. FIG. 10 graphically shows the change of surges when capacitor C is fixed to 2,000 microfarads and inductor L is varied from 2.6 to 18 millihenries. A surge with a magnitude of about 1.4 amperes arises when inductor L is 2.6 millihenries, while the surge decreases below one ampere when inductor L increases to 18 millihenries.

Figure 11:
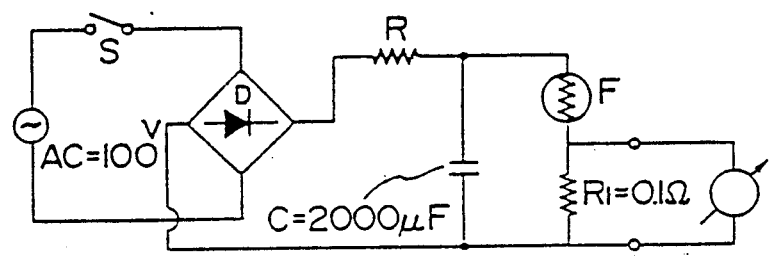
FIG. 11 is the circuit used to determine the change of surges when the resistance value of the resistor is varied and the capacitance of the capacitor is held constant.
Figure 12:
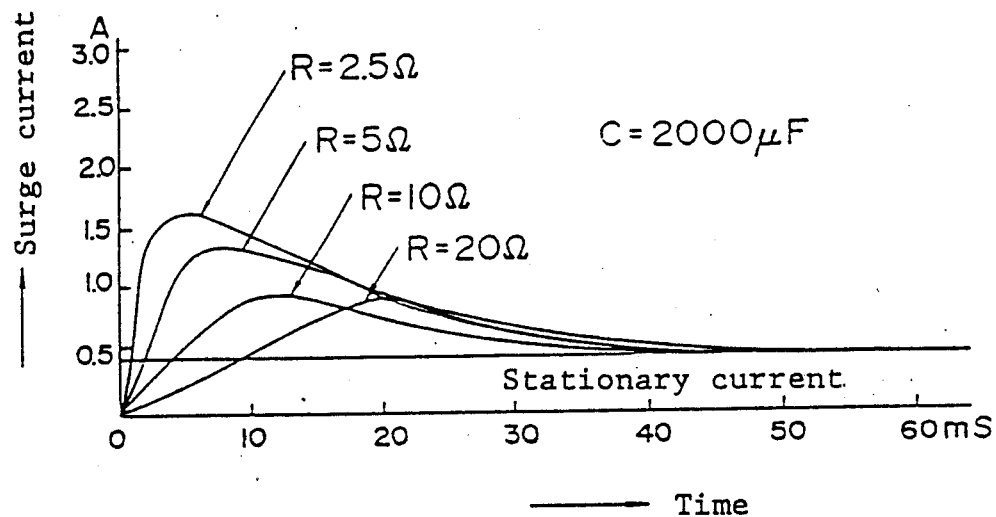
FIG. 12 is the time course of surges as determined with the circuit as shown in FIG. 11.

FIG. 11 is a circuit wherein resistor R is provided in the output circuit of diode bridge D. FIG. 12 graphically shows the change of surges when the circuit resistor R is varied from 2.5 ohms to 20 ohms and capacitor C is fixed to 2,000 microfarads. A surge with a magnitude of about 1.6 amperes arises when resistor R is 2.5 ohms, while the surge decreases about to 0.9 amperes when resistor R increases to 20 ohms.

In either case, the surge is very much by and amount of about 7 amperes than that usually observed in connection with a 40 watt incandescent lamp. This is effective in decreasing the outage of incandescent lamps.

As described above, since in the present invention ac current is used after rectification, the time-dependent luminous variation, i.e. flicker, can be reduced.

Furthermore, since in the present invention the filament of an incandescent lamp is heated to a temperature over its rating, a bright illumination similar to sunlight that bears all the spectrum components ranging from the far-red to the ultraviolet region can be attained.

Additionally, since in the present invention the switch-on surges are limited, a bright illumination can be attained without shortening the life of incandescent lamp.

Figure 13:
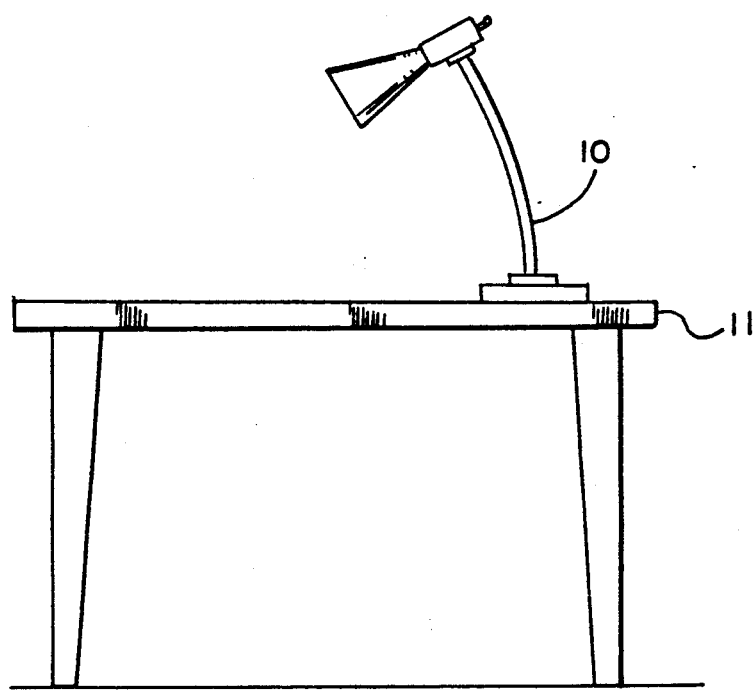
FIG. 13 show a desk lamp on a desk, the desk lamp incorporating the lighting equipment of the present invention.

Thus, the present invention can be advantageously used in a desk or table lamp 10 for a desk or table 11, as shown in FIG. 13, as well as in other luminous sources using incandescent lamps such as those for street lamps, gate lamps, and a lounge lamps for use in some buildings including hotels.

Additionally, the present invention can be advantageously used in luminous sources for microscopes, vehicles, advertising signs, signals, and high-speed cameras. Specific incandescent lamp for controlling the physiology of animals and plants, for example, those using silica or borosilicate glass for controlling egg-laying of chickens and flowering of plants, are operable with the lighting equipment according to the invention.

While preferred embodiments have been described, variations thereto will occur to those skilled in the art within the scope of the present inventive concepts which are delineated by the following claims.

I claim:

1. A lighting equipment for providing bright illumination with limited surge, comprising:

a capacitor connected in parallel with an incandescent lamp incorporating a filament having a predetermined rating;

an inductance connected between said capacitor and an ac source, said inductance forming together with said capacitor a time constant circuit which controls the charge and discharge of said capacitor so as to limit a surge into said incandescent lamp;

means for rectifying the current from said ac source; and means for selecting the value of said inductance to supply the rectified current to said filament of said incandescent lamp in order to heat said filament over said predetermined rating;

wherein said filament is protected by the limiting of said surge when dc power is supplied to it from said ac source via said rectifier, the value of a surge decreasing with increase in said selected value of said inductance, said bright illumination during said heating of said filament over said predetermined rating having wavelength components extending from ultraviolet to infrared.

2. The equipment of claim 1, wherein said inductance and said means for selecting said value of said inductance are constituted by a variable inductor.

3. The equipment of claim 1, comprising a desk lamp incorporating said capacitor, incandescent lamp, inductance and means for rectifying and selecting.

4. The equipment of claim 1, wherein said inductance is connected between said ac source and said means for rectifying.

5. The equipment of claim 1, wherein said inductance is connected between said means for rectifying and the parallel connection of said capacitor and said incandescent lamp.

6. A lighting equipment for providing bright illumination with limited surge, comprising:

a capacitor connected in parallel with an incandescent lamp incorporating a filament having a predetermined rating;

an inductance connected between said capacitor and an ac source, said inductance forming together with said capacitor a time constant circuit which controls the charge and discharge of said capacitor so as to limit a surge into said incandescent lamp;

means for rectifying the current from said ac source; and means for selecting the value of said inductance to supply the rectified current to said filament of said incandescent lamp in order to heat said filament over said predetermined rating;

wherein said filament is protected by the limiting of said surge when dc power is supplied to said filament from said ac source via said rectifier, the value of a surge decreasing with increase in said selected value of said inductance, said bright illumination during said heating of said filament over said predetermined rating having wavelength components extending from ultraviolet to infrared, and wherein said inductance is connected between said ac source and said means for rectifying.

7. A lighting equipment for providing bright illumination with limited surge, comprising:

a capacitor connected in parallel with an incandescent lamp incorporating a filament having a predetermined rating;

an inductance connected between said capacitor and an ac source, said inductance forming together with said capacitor a time constant circuit which controls the charge and discharge of said capacitor so as to limit a surge into said incandescent lamp;

means for rectifying the current from said ac source; and means for selecting the value of said inductance to supply the rectified current to said filament of said incandescent lamp in order to heat said filament over said predetermined rating;

wherein said filament is protected by the limiting of said surge when dc power is supplied to said filament from said ac source via said rectifier, the value of a surge decreasing with increase in said selected value of said inductance, said bright illumination during said heating of said filament over said predetermined rating having wavelength components extending from ultraviolet to infrared, and wherein said inductance is connected between said means for rectifying and the parallel connection of said capacitor and said incandescent lamp and directly to said means for rectifying and said parallel connection.

8. The equipment of claim 6, said means for selecting comprising a switch for selectively cutting off the supply of said power to said filament.

9. The equipment of claim 7, said means for selecting comprising a switch for selectively cutting off the supply of said power to said filament.

10. The equipment of claim 8, wherein said inductance is an inductor, and the capacitance value of said capacitor and the value of said inductance are set in such manner that they decrease the effective power of said surges received by said incandescent lamp.

11. The equipment of claim 9, wherein said inductance is an inductor, and the capacitance value of said capacitor and the value of said inductance are set in such manner that they decrease the effective power of said surges received by said incandescent lamp.

12. The equipment of claim 6, wherein said inductance is an inductor, and the capacitance value of said capacitor and the value of said inductance are set in such manner that they decrease the effective power of said surges received by said incandescent lamp.

13. The equipment of claim 7, wherein said inductance is an inductor, and capacitance value of said capacitor and the value of said inductance are set in such manner that they decrease the effective power of said surges received by said incandescent lamp.

* * * * *